(No Model.)
C. SCHMITZ.
APPARATUS FOR OYSTER CULTURE.
No. 301,285. Patented July 1, 1884.
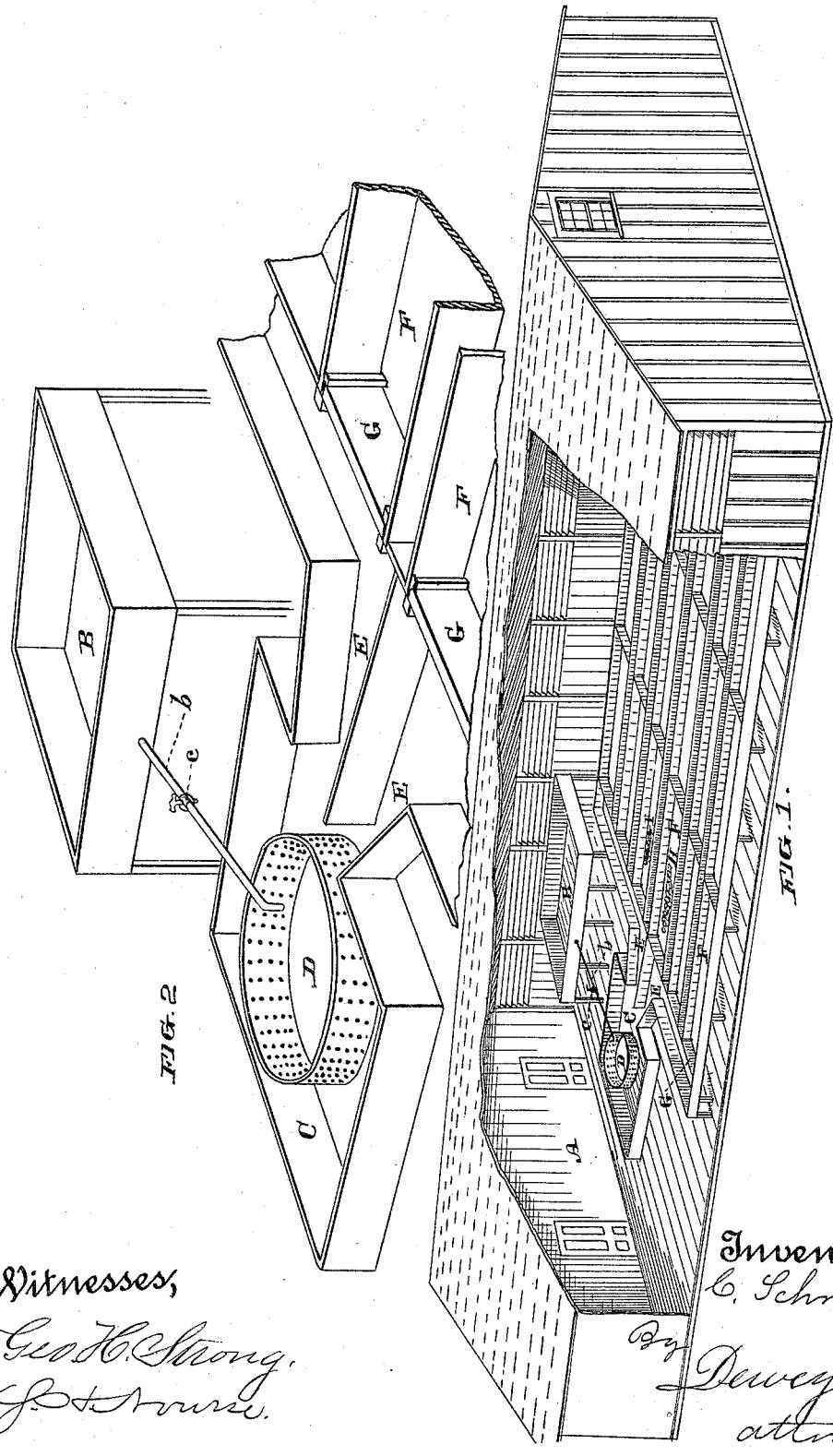

UNITED STATES PATENT OFFICE.

CHRISTOPHER SCHMITZ, OF SAN FRANCISCO, CALIFORNIA.

APPARATUS FOR OYSTER-CULTURE.

SPECIFICATION forming part of Letters Patent No. 301,285, dated July 1, 1884.

Application filed February 12, 1884. (No model.) Patented in Mexico August 23, 1883.

*To all whom it may concern:*

Be it known that I, CHRISTOPHER SCHMITZ, of the city and county of San Francisco, and State of California, have invented an Improvement in Oyster-Culture; and I hereby declare the following to be a full, clear, and exact description thereof.

My invention relates to a new and useful process of and apparatus for oyster-culture; and it consists in the combination of devices hereinafter explained and claimed. To this end I have a novel apparatus, consisting of an annular perforated vessel set in a surrounding basin communicating with canals provided with rocks and rubbish in their bottoms, and a means for supplying a gentle flow of sea-water to said perforated vessel.

This apparatus and the operation of my process I shall now fully describe.

Referring to the accompanying drawings, Figure 1 is a perspective view of my apparatus. Fig. 2 is an enlarged detail view of the tank B and the basin and its connections.

A is the house of the nursery. B is a water-tank furnishing the necessary supply of sea-water. C is a basin or vessel, in the center of which is an annular vessel, D, having its sides perforated, as shown. From the basin C lead passages E, communicating with the canals F. These canals are provided with vertically-adjustable gates G, whereby each is divided into a number of compartments. Between the water-tank B and vessel D is a small water-pipe, b, provided with a cock, c, whereby the flow of water into the vessel may be nicely regulated. In the canals F are placed stones H and rubbish I for the young oysters to cling to. These parts constitute the apparatus. I shall now explain the method of using it.

I place the oysters when near their spawning or "sick" time in the vessel D, containing sea-water. This time or event is when the two vesicles of the animal which contain the eggs and milk commence to swell until the membrane bursts and fertilization takes place. Soon after this the spat or spawn may be extracted by the operator, or the animal will itself expel them in the course of nature. I allow a very fine stream of the sea-water to pass through pipe b into vessel D. Thence it passes through the perforated sides of said vessel in innumerable small and gentle currents widely spread into the basin C. The young are alive when expelled by the mother, and they float around and pass out through the sides of vessel D with the currents into basin C. Thence they float gently into the canals until they find the stones and rubbish, to which they adhere by means of a small tentacle with which they are provided. The first necessity of the life of the young oyster is that it shall find something to which to adhere and be able to cling to it. If it cannot do this, it perishes. My apparatus as a whole conduces to this general result.

By the employment of the perforated vessel D, I hold the spawn together until ready to float off. Then when it does go it follows the small and gentle currents flowing outwardly in all directions, and becomes well separated and distributed, giving each living young oyster a chance to find its lodgment.

The use I make of the gates G is as follows: I close down the first set—namely, those nearest the entrance, and allow a small flow into the canals above them. The young then coming down with the gentle current find such stones or rubbish as may be in that part of the canals and cling to them. I turn the cock c to shut off the supply of water until as many of the young as possible settle down to their places. Then I close the next set of gates and open the first, and again turn on the supply.

Having thus described my invention, what I claim as new, and desire to secure by Letters Patent, is—

1. The combination, with the water-tank B, having the pipe b and cock c, of the basin C, provided in its center with a perforated annular vessel, D, a series of passages formed by the extended sides of the basin and divided by a central partition, and a series of vertically-adjustable gates, G, and canals, constructed as shown, and for the purpose herein set forth.

2. The basin C, having outlets E, and the annular perforated vessel D, in combination with the canals F, having gates G, adjustable, and rocks or rubbish in their bottoms, and a means for supplying vessel D with a gentle flow of sea-water, substantially as herein described.

In witness whereof I have hereunto set my hand.

CHRISTOPHER SCHMITZ.

Witnesses:
S. H. NOURSE,
H. C. LEE.